INVENTORS
TADAO NANGOH
ISAMU YAMAZAKI
BY
H. Edward Mestern

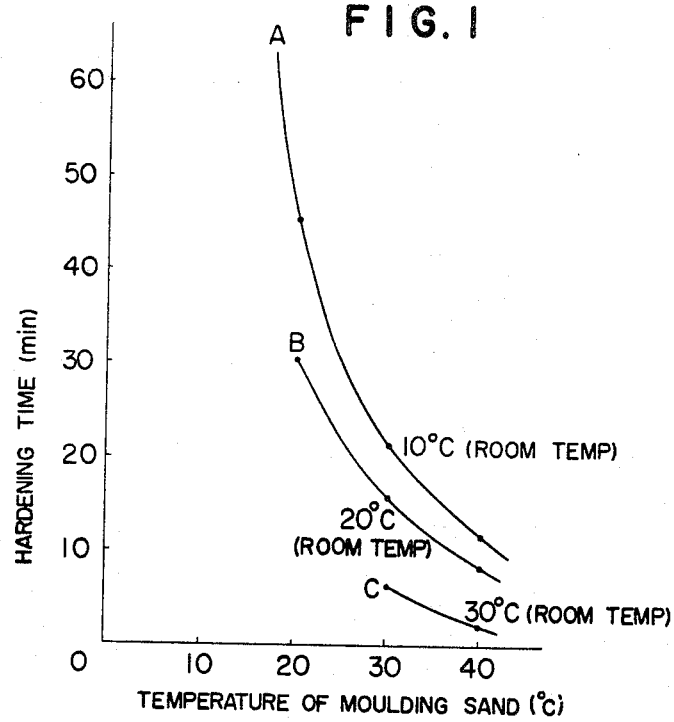
FIG. I
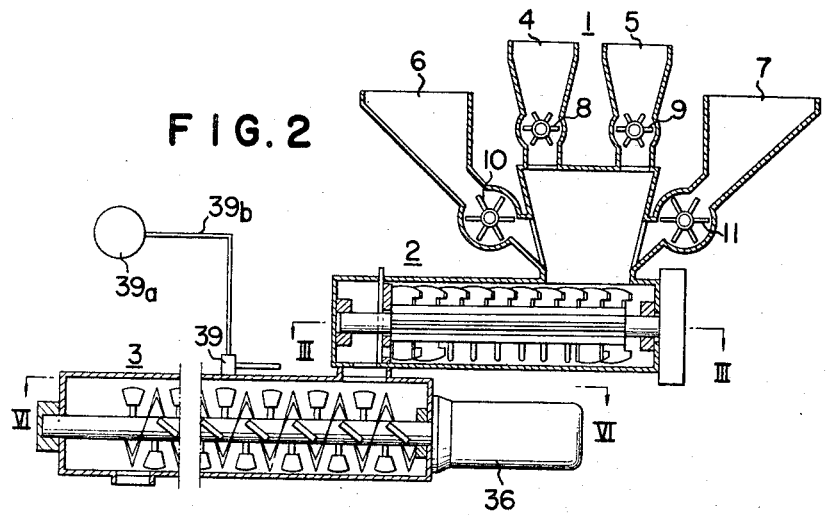
FIG. 2
INVENTORS
TADAO NANGOH
ISAMU YAMAZAKI
BY
H. Edward Madore

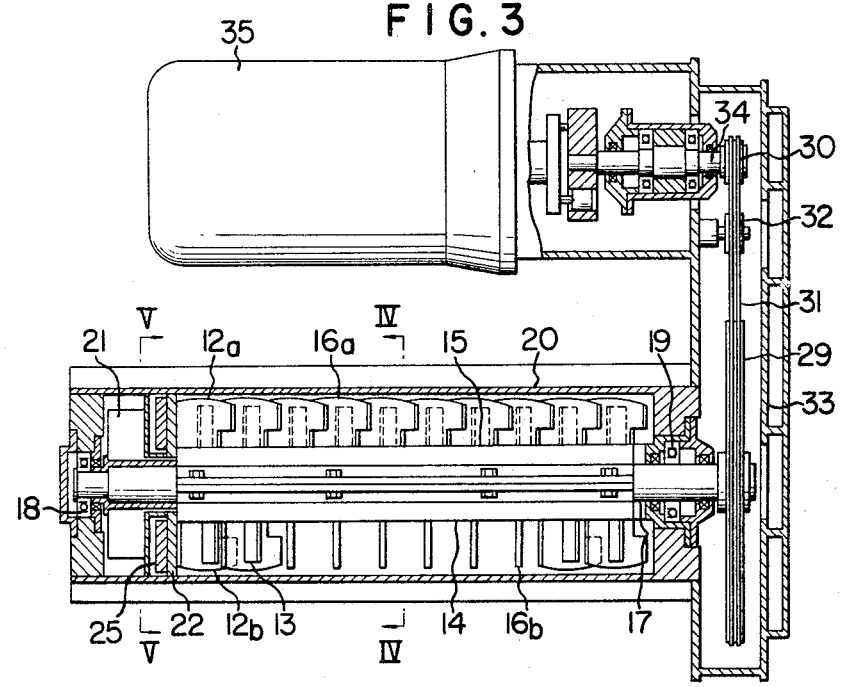
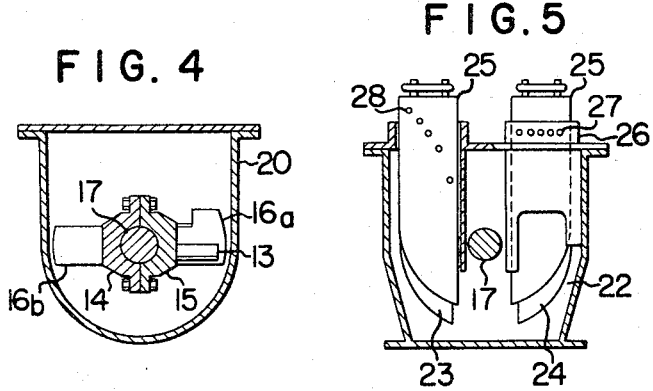

United States Patent Office 3,387,829
Patented June 11, 1968

3,387,829
MIXER FOR PRODUCING SELF-HARDENING MOULDING SANDS
Tadao Nangoh, 115 1-chome, Sunahara-cho, Katsushika-ku, and Isamu Yamazaki, 13-1-405 3-chome, Towa Adachi-ku, both of Tokyo-to, Japan
Filed Oct. 6, 1965, Ser. No. 493,442
Claims priority, application Japan, Nov. 19, 1964, 39/65,063
5 Claims. (Cl. 259—161)

This invention relates to foundry or moulding sands and more particularly it relates to a new and efficient apparatus for producing self-hardening moulding sands of uniform quality.

Heretofore, self-hardening moulding sands have been produced by various processes such as the so-called "N process" (silica sand+ferrosilicon+water glass) and the so-called "M process" (silica sand+sodium silicofluoride powder+water glass). In these processes, self-hardening sand is produced by mixing and kneading various moulding sand materials in a single mixer. The N process will be briefly considered as one representative example of these processes.

In the N process, self-hardening moulding sand is produced by charging a mixer with silica sand for face sand or back sand, ferrosilicon, coal powder, and other materials, mixing and kneading the charge, then adding water glass to the charge, and again mixing and kneading the resulting charge. When this self-hardening moulding sand is packed and left in a moulding box, it undergoes progressive chemical reaction whereby it hardens, whereupon the mould is completed. In recent years this method of making moulds with the use of self-hardening moulding sands has been progressively and widely reduced to practice, and is commonly referred to as the N process.

Since this self-hardening moulding sand undergoes progressive hardening reaction immediately after production, it must be promptly packed into the moulding box after it is taken out of the mixer. The hardening time of this moulding sand after it is packed into the moulding box has a close relationship to factors such as the temperature of the moulding sand immediately after mixing and kneading in the mixer and the room temperature of the mould forming place.

In order to produce castings by a steady flow line procedure in a planned manner with foundry equipment of already determined maximum performance capacities such as those for moulding and pouring, the capacity of the moulding sand mixer is matched with the capacities for moulding and pouring. Accordingly, it is necessary that the hardening time of the moulding sand after packing into the moulding boxes be stably constant throughout the year. By the conventional processes, however, it has not been possible to fulfil this requirement.

Furthermore, in the conventional processes the mixing has been carried out by batch system mixers such as those for whirl mix into which the starting materials for the moulding sand are charged simultaneously. Consequently, residual moulding sand during or after reaction remains in the interior of the mixers, causing the starting materials to segregate, and sands of uniform character could not be produced. Moreover, since moulding sand which has already reacted adheres tenaciously to the mixer walls and agitator blades, frequent cleaning and removal of this sand had to be resorted to.

It is a general object of the present invention to overcome the various difficulties described above.

More specifically, a first object of the present invention is to provide an apparatus for producing self-hardening moulding sand having a hardening time which can be stabilized throughout the year in the foundry mould making process wherein self-hardening moulding sand is used.

A second object of the invention is to provide an apparatus for producing a required quantity per unit time of a self-hardening moulding sand.

A third object of the invention is to provide an apparatus for continuously producing self-hardening moulding sand of uniform character, which apparatus is capable of preventing occurrence of modulation or lumping of the sand.

In this apparatus for mixing self-hardening moulding sand, the mixing operation is divided into first and second processes and accomplished by mixing moulding sand materials in a first mixer of the first process, in which the effect of the materials being heated by the conversion of the mechanical work applied thereto into heat is utilized, adding to the mixed sand transferred from the first mixer into a second mixer of the second process a liquid binder for causing self-hardening reaction, and further mixing the mixed sand and binder thereby to produce a moulding sand in which the mixed sand is mixed with the binder to cause self-hardening reaction.

Further, the moulding sand materials are agitated and mixed by the first mixer and are thereby heated to a specific temperature, and, by the second mixer, a liquid binder is added to the heated mixed sand transferred from the first mixer, the resulting mixed sand with the binder being further mixed and rendered into a self-hardening moulding sand, which is then taken out of the second mixer. While, in the second mixer, the mixed sand and binder undergo chemical reaction and generate heat, the temperature of the mixed sand taken out can be adjusted to a desired value by regulating the quantity of mechanical work applied to the materials in the first mixer.

The nature, principle, and details of the invention will become more apparent from the following detailed description with respect to a preferred embodiment of the invention, when read in conjunction with the accompanying drawings, in which like parts are designated by like reference numerals, and in which:

FIG. 1 is a graphical representation indicating relationships between hardening time and temperature of moulding sand at various room temperatures;

FIG. 2 is a side elevational view, mostly in vertical section, showing a mixer constituting a preferred embodiment of the invention;

FIG. 3 is a sectional view taken along the plane indicated by line III—III in FIG. 2 and showing a first mixer;

FIG. 4 is a sectional view taken along the plane indicated by line IV—IV in FIG. 3;

FIG. 5 is a sectional view taken along the plane indicated by line V—V in FIG. 3;

Figure 6:
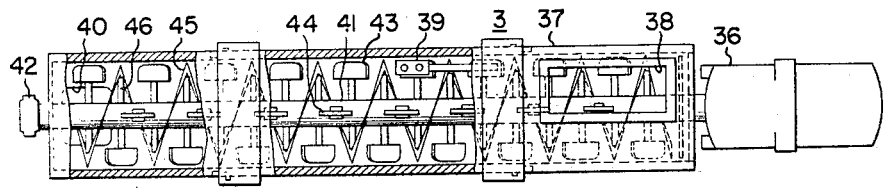
FIG. 6 is a sectional view taken along the plane indicated by line VI—VI in FIG. 2 and showing a second mixer.

Referring to FIG. 1, curves A, B, and C indicate the relationships between the temperature of a self-hardening moulding sand and its hardening time for the cases, respectively, of room temperatures of 10, 20, and 30° C. For example, for a given temperature of the moulding sand of 30° C., moulding sand hardens in approximately 23 minutes at a room temperature of 10° C., approximately 17 minutes at a room temperature of 20° C., and approximately 6 minutes at a room temperature of 30° C.

Referring to FIG. 2, the moulding sand mixer shown therein is a combination essentially of a raw material supplying device 1, a first mixer 2 and a second mixer 3.

The raw material supplying device 1 comprises essentially a hopper 4 for supplying ferrosilicon, a hopper 5 for supplying an additive such as coal powder, a face sand hopper 6, and a hopper 7 for supplying raw material sand for back sand, these hoppers 4, 5, 6 and 7 being provided respectively with rotary feeders 8, 9, 10 and 11 for regulating the rates of supply of their respective raw materials to the first mixer 2.

The construction of the first mixer 2 is shown in FIG. 3, in which two sets of paddle-shaped agitator blades 12a and 12b at the ends within the first mixer are supported by reinforcing members 13 and are fixedly imbedded at their root portions in mounting members 14 and 15 at an angle of approximately 45° relative to the axis of a blade rotor shaft 17. These mounting members 14 and 15 are in turn mounted on the blade rotor shaft 17 and secured by bolts and nuts as shown in FIG. 4.

Between the agitator blades 12a and 12b at the ends of the mixer, there are provided a row of agitator blades 16a on one side of the shaft 17 and a row of agitator blades 16b on the other side thereof, the blades 16a being of the same shape as the blades 12a and 12b, and the blades 16b being of flat plate shape. The blades 16a and 16b are imbedded at their roots in the mounting members 15 and 14 at suitable space intervals at angles of approximately 45 and 90°, respectively, relative to the axis of the blade rotor shaft.

The blade rotor shaft 17 is supported on bearings 18 and 19 at the extremities of the mixer casing 20 of the mixer 2. The raw material supplying device 1 shown in FIG. 2 is connected to the inlet end (the right-hand end as viewed in FIGS. 2 and 3) of the mixer casing 20, which is provided with a discharge outlet 21 for mixed sand at its outlet end.

Upstream from the discharge outlet 21 and in the vicinity thereof, there is provided a partition wall 22 having symmetrically formed, mixed sand flow-out openings 23 and 24 as shown in FIG. 5. The aperture areas of the openings 23 and 24 are controllable by gates 25 which can be raised or lowered along gate guide frames 26 provided on the partition wall 22, whereby the resistance to the outflow of the mixed sand to the second mixer 3 can be adjusted. Each gate 25 can be locked in a suitable position in its gate guide frame 26 by pin-locking a hole selected from a number of holes 27 in the frame 26 to the corresponding hole 28 in the gate 25. The operation of the gates 25 is not limited to manual operation but may be accomplished by any other suitable means such as a hydraulic system.

Referring again to FIG. 3, the blade rotor shaft 17 is driven by a motor 35 through a power transmission mechanism comprising a sprocket shaft 34 fixed to a driving sprocket 30, a driven sprocket 29 fixed to the shaft 17, and a sprocket chain 31 passed over the sprockets 30 and 29 and guided by an idler sprocket 32, said mechanism being housed within a cover 33. The number of poles of the motor 35 is variable, whereby the rotational speed of the blade rotor shaft 17 can be changed. Alternatively, this rotational speed may be changed by a speed-changing device such as a gear mechanism.

In the operation of the mixer according to the invention to produce self-hardening moulding sand, the motors 35 and 36 of the first and second mixers 2 and 3 are first started, and then, by operating the rotary feeders 8, 9, and 10 or 11, the materials such as raw material sand, ferrosilicon, and coal powder are fed into the first mixer 2. The raw materials so fed are thereupon agitated by the paddle-shaped agitator blades 12a, 12b, and 16a and agitator plates 16b. The temperature of the materials so agitated during this process is caused to rise by the mechanical work applied to the agitation, and the mixed sand in the heated state is discharged through the discharge outlet 21 into the second mixer 3.

The temperature rise in the mixed sand due to the first mixer 2 can be regulated by varying the vertical positions of the gates 25 thereby varying the resistance to outflow of the mixed sand or by adjusting the rotational speed of the agitator blades thereby adjusting the rate of mechanical work applied to the mixed sand.

Figure 7:
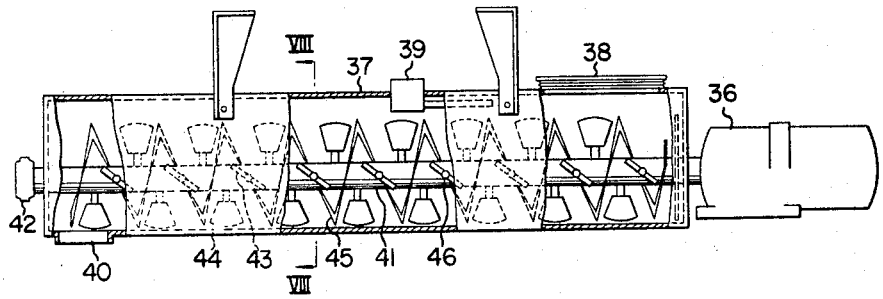
FIG. 7 is a side view, partly in section and with parts cut away, of FIG. 6.
Figure 8:
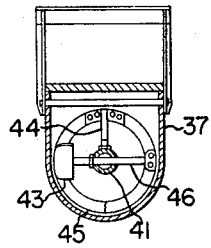
FIG. 8 is a sectional view taken along the plane indicated by the line VIII—VIII in FIG. 7.

Referring to FIGS. 6, 7, and 8 showing the construction of the second mixer 3, the casing 37 of this mixer 3 is provided with a mixed sand receiving inlet 38 communicating with the aforementioned discharge outlet 21 of the first mixer 2 at its inlet end (the right-hand end as viewed in FIGS. 2, 6, and 7), a water glass injection nozzle 39 at its intermediate part, and a mixed sand discharge outlet 40 at its outlet end. By disposing the water-glass injection nozzle 39 at a position which is at a distance of approximately one half of the total length of the second mixer 3 from the receiving inlet 38, it is possible to prevent formation of lumps which interfere with uniform mixing of the moulding sand. The nozzle 39 is supplied with water glass by a supply pump 39a through a conduit 39b as shown in FIG. 2.

The second mixer 3 has within its casing 37 a longitudinally extending blade rotor shaft 41 which is supported at the outlet end on a bearing 42 mounted on the casing 37 and has longitudinal rows of two kinds of agitator plates 43 and 44 and a ribbon screw agitator blade 45. Each of the agitator plates 43 is set at an angle relative to the axis of the blade rotor shaft 41, while each agitator plate 44 is positioned parallelly to said axis, all of the agitator plates being supported on support arms fixed at their roots to the rotor shaft 41 in the space between the helically wound turns of the ribbon screw agitator 45. The ribbon screw agitator 45 is fixed to and supported by extensions of the support arms 46 of the agitator plates 43. The blade rotor shaft is driven by the aforementioned motor 36.

Within the second mixer 3, the water glass injected through the nozzle 39 is dispersed over the mixed sand sent from the first mixer. The mixed sand and water glass are conveyed as they are uniformly mixed by the ribbon screw agitator blade 45 and agitator plates 43 and 44, and self-hardening moulding sand of the desired temperature is taken out through the discharge outlet 40.

In order to indicate still more fully the nature of the invention, a specific example of preparing moulding sand by means of the mixer according to the present invention will be described.

In the case where the blending proportions of the moulding sand raw materials is 100 parts of sand and 2 parts of ferrosilicon (by weight), and the room temperature is 10° C., the temperature of the raw materials sand rises to approximately 25° C. because of the agitation within the first mixer when the peripheral speed of the agitator blades of the first mixer is 240 metres/min., and heat is generated by the addition of 5 parts of water glass in the second mixer, whereby self-hardening moulding sand at a desired temperature of approximately 30° C. is taken out through the discharge outlet 40. Since the hardening time of moulding sand at this temperature is approximately 23 minutes, for example, according to curve A shown in FIG. 1, it is suitable for mould making at a temperature of 10° C.

It has been found that, in order to produce a good mixture of uniform particles, it is necessary that the peripheral speed of the paddle-shaped agitator blades of the first mixer be at least 100 metres/min.

On the other hand, in the second mixer, since the self-hardening moulding sand adheres to the interior surfaces of the mixer and causes the wear of the ribbon screw blade to increase, it is necessary to lower the agitation speed as much as possible without impairing the uniform mixing of the water glass. More specifically, it has been found that the peripheral speed of the ribbon screw blade of the second mixer should be in the range of from 20 to 80 metres/min. The necessity of using a low speed in the second mixer is indicated by one actual instance wherein continuous operation at 40 r.p.m. of the agitator rotor caused a wear of approximately 1 mm. at the extreme periphery of the blade 45 in 10 hours and a wear of approximately 3 mm. in 50 hours.

The position of the nozzle 39 for adding water glass in the second mixer is also important. Experiments with various shapes and sizes of the nozzles 39 were carried out for the case wherein the nozzle 39 is disposed directly below the discharge outlet 21 of the first mixer 2 to add water glass to the particles being discharged into the second mixer 3. In all cases, however, the results were not satisfactory, approximately 0.8 percent of lumps being formed. Accordingly, the nozzle 39 was installed at a position at a distance of within one half of the total length of the second mixer from the mixed sand receiving inlet 38 of the second mixer, whereupon it was possible to prevent the formation of lumps.

In place of the aforementioned ferrosilicon, suitable materials such as powdered sodium silicofluoride are used in other processes.

By the practice of the present invention as described above, it is possible to stabilize the hardening time of the resulting self-hardening moulding sand throughout the year since by the use of the mixer according to the invention, self-hardening moulding sand at the optimum temperature in accordance with the room temperature of the material for making moulds can be produced. Furthermore, it is possible to produce moulding sand of uniform character without adhesion of the sand to the agitator blades.

Another important feature of the mixer of the present invention is that the rise of temperature of the moulding sand in the mixing process can be adjusted to a desired value by controlling the resistance to flow of the moulding sand and by controlling the rotational speed of the agitator blades. A further important feature of the instant mixer is that it is capable of continuously producing self-hardening moulding sands of uniform character without lumps of moulding sand, which are prevented from forming by the specific position of the nozzle for adding a binder as described above.

Accordingly, by the use of the mixer according to the present invention, production efficiency can be greatly increased in the founding industry.

It should be understood, of course, that the foregoing disclosure relates to only a preferred embodiment of the invention and that it is intended to cover all changes and modification of the example of the invention herein chosen for the purposes of the disclosure, which do not constitute departures from the spirit and scope of the invention as set forth in the appended claims.

What we claim is:

1. A mixer for producing self-hardening moulding sands comprising: a supply device for supplying moulding sand materials in particle form, said device having a plurality of hoppers for separately supplying respectively different moulding sand materials in particle form; a first mixer for forced mixing of said moulding sand materials, said first mixer having a plurality of agitator blades mounted around a rotating shaft, means to control the resistance to outflow of mixed sand, and means to control the rotational speed of the agitator blades; a second mixer for agitating mixed sand discharged from the first mixer together with a liquid binder, said second mixer having at its inlet end an inlet opening for receiving said mixed sand from the first mixer, a nozzle for adding said binder to said mixed sand, and a plurality of agitator blades mounted around a rotating shaft; and power means to drive the first and second mixers, said mixed sand discharged from the first mixer being mixed with the binder in the second mixer to cause self-hardening reaction.

2. The mixer as claimed in claim 1, wherein the agitator blades of the first mixer are of paddle shape, and at least one of the agitator blades of the second mixer is of ribbon screw form.

3. The mixer as claimed in claim 1, wherein the rotational speed of the agitator blades of the first mixer is caused to be higher than the rotational sped of the agitator blades of the second mixer.

4. The mixer as claimed in claim 1, wherein the means to control the resistance to outflow of mixed sand in the first mixer comprises a partition wall having openings and gate devices to control the aperture areas of said openings.

5. The mixer as claimed in claim 1, wherein the nozzle for adding the liquid binder in the second mixer is disposed at a position which is at a distance within one half of the total interior length of the second mixer from the inlet opening at the inlet end.

References Cited

UNITED STATES PATENTS

| 1,370,764 | 3/1921 | Popkess | 259—178 |
| 1,622,294 | 3/1927 | Saulnier | 259—165 X |
| 2,028,745 | 1/1936 | Hendrick | 259—153 X |
| 2,861,787 | 11/1958 | Csanyi | 259—153 |
| 2,710,744 | 6/1955 | Hensler | 259—157 |

ROBERT W. JENKINS, *Primary Examiner.*

UNITED STATES PATENT OFFICE
CERTIFICATE OF CORRECTION

Patent No. 3,387,829                                   June 11, 1968

Tadao Nangoh et al.

It is certified that error appears in the above identified patent and that said Letters Patent are hereby corrected as shown below:

In the heading to the printed specification, lines 4 to 6, "Tadao Nangoh, 115 1-chome, Sunahara-cho, Katsushika-ku, and Isamu Yamazaki, 13-1-405 3-chome, Towa Adachi-ku, both of Tokyo-to, Japan" should read -- Tadao Nangoh and Isamu Yamazaki, Tokyo-to, Japan, assignors to Kabushiki Kaisha Hitachi Seisakusho, Tokyo-to, Japan, a joint-stock company of Japan --.

Signed and sealed this 13th day of January 1970.

(SEAL)
Attest:

Edward M. Fletcher, Jr.                        WILLIAM E. SCHUYLER, JR.
Attesting Officer                                Commissioner of Patents